(12) United States Patent
Spellman et al.

(10) Patent No.: US 10,286,614 B2
(45) Date of Patent: May 14, 2019

(54) COMPOSITE PART MANUFACTURING COMPENSATION SYSTEM AND METHOD

(71) Applicant: Autodesk, Inc., San Rafael, CA (US)

(72) Inventors: Michael Spellman, Riverdale, NJ (US); Jeff Godfrey, Warrensburg, MO (US); Gregory MacLean, Old Tappan, NJ (US)

(*) Notice: Subject to any disclaimer, the term of this patent is extended or adjusted under 35 U.S.C. 154(b) by 534 days.

(21) Appl. No.: 14/923,222

(22) Filed: Oct. 26, 2015

(65) Prior Publication Data

US 2016/0121556 A1 May 5, 2016

Related U.S. Application Data

(63) Continuation of application No. 12/965,786, filed on Dec. 10, 2010, now Pat. No. 9,186,849.

(60) Provisional application No. 61/285,191, filed on Dec. 10, 2009.

(51) Int. Cl.

| | |
|---|---|
| *G06F 19/00* | (2018.01) |
| *B29C 70/38* | (2006.01) |
| *B29C 69/00* | (2006.01) |
| *G05B 19/4093* | (2006.01) |
| *B29L 9/00* | (2006.01) |
| *B29C 70/54* | (2006.01) |

(52) U.S. Cl.
CPC ............ *B29C 70/38* (2013.01); *B29C 69/005* (2013.01); *G05B 19/40937* (2013.01); *B29C 70/545* (2013.01); *B29L 2009/00* (2013.01); *G05B 2219/45238* (2013.01); *G05B 2219/49002* (2013.01); *G05B 2219/49013* (2013.01); *Y02P 80/30* (2015.11); *Y02P 80/40* (2015.11)

(58) Field of Classification Search
CPC ........ G01B 11/00; B29C 70/38; B29C 69/005; B29C 70/545; B29L 2009/00; G05B 19/40937; G05B 2219/49002
See application file for complete search history.

(56) References Cited

U.S. PATENT DOCUMENTS

| | | | | |
|---|---|---|---|---|
| 4,848,137 A | * | 7/1989 | Turner | G05B 19/41875 33/502 |
| 5,088,047 A | * | 2/1992 | Bynum | B22F 3/1055 156/272.8 |
| 5,341,183 A | * | 8/1994 | Dorsey-Palmateer | G01B 11/24 353/122 |

(Continued)

*Primary Examiner* — Michael D Masinick
(74) *Attorney, Agent, or Firm* — Ohlandt, Greeley, Ruggiero & Perle, L.L.P.

(57) ABSTRACT

A method and system for assisting in the manufacture of composite parts such as those used for various high-strength assemblies such as aircraft wings, vertical stabilizers, racing car shells, boat hulls, and other parts which are required to have a very high strength to weight ratio. The system uses laser technology to measure the resultant surfaces of a first manufactured composite part. A computer system analyzes and compares the as-built dimensions with the required production specifications. Supplemental composite filler plies are designed including shape and dimensions. These plies are nested together into a single composite sheet and manufactured to minimize wasted material. The plies are then cut out and applied to the first part guided by a laser projection system for locating the plies on the part. The part is then re-cured. The final assembly is then re-measured for compliance with production dimensions.

22 Claims, 12 Drawing Sheets

(56) References Cited

U.S. PATENT DOCUMENTS

| | | | | |
|---|---|---|---|---|
| 5,450,147 A * | 9/1995 | Dorsey-Palmateer | | G01B 11/24 |
| | | | | 353/122 |
| 5,651,600 A * | 7/1997 | Dorsey-Palmateer | | G01B 11/24 |
| | | | | 353/122 |
| 6,000,801 A * | 12/1999 | Dillon | | G01B 11/24 |
| | | | | 353/121 |
| 6,547,397 B1 * | 4/2003 | Kaufman | | G01B 11/002 |
| | | | | 353/122 |
| 6,843,565 B2 * | 1/2005 | Evans | | B29C 70/34 |
| | | | | 353/28 |
| 6,907,651 B1 * | 6/2005 | Fisher | | B64C 1/12 |
| | | | | 29/402.06 |
| 7,241,981 B2 * | 7/2007 | Hofmann | | B28D 1/043 |
| | | | | 250/201.1 |
| 7,268,893 B2 * | 9/2007 | Palmateer | | B64F 5/60 |
| | | | | 250/206.1 |
| 8,524,022 B2 * | 9/2013 | Iliopoulos | | B64C 3/185 |
| | | | | 156/64 |
| 9,162,417 B2 * | 10/2015 | Iliopoulos | | B64C 3/185 |
| 2001/0046323 A1 * | 11/2001 | Cork | | B64F 5/00 |
| | | | | 382/203 |
| 2003/0090025 A1 * | 5/2003 | Nelson | | B29C 70/086 |
| | | | | 264/162 |
| 2004/0217497 A1 * | 11/2004 | Engwall | | B29C 70/545 |
| | | | | 264/40.1 |
| 2005/0082262 A1 * | 4/2005 | Rueb | | B25H 7/00 |
| | | | | 219/121.6 |
| 2006/0191622 A1 * | 8/2006 | Ritter | | G01N 25/72 |
| | | | | 156/64 |
| 2007/0193655 A1 * | 8/2007 | Lee | | B23D 59/008 |
| | | | | 144/348 |
| 2008/0164376 A1 * | 7/2008 | Kato | | B64C 3/28 |
| | | | | 244/132 |
| 2010/0112190 A1 * | 5/2010 | Drewett | | B29C 70/54 |
| | | | | 427/9 |
| 2010/0327114 A1 * | 12/2010 | Iliopoulos | | B64C 3/185 |
| | | | | 244/123.1 |
| 2014/0023830 A1 * | 1/2014 | Iliopoulos | | B64C 3/185 |
| | | | | 428/172 |
| 2014/0261970 A1 * | 9/2014 | Moors | | B29C 70/021 |
| | | | | 156/87 |
| 2017/0225768 A1 * | 8/2017 | Thompson | | B64C 3/26 |
| 2017/0228494 A1 * | 8/2017 | Thompson | | G06F 17/5095 |
| 2017/0371980 A1 * | 12/2017 | Mallapragada | | B32B 41/00 |

* cited by examiner

Cured Laminate Compensation (CLC) workflow

COMPOSITE PART MANUFACTURING COMPENSATION SYSTEM AND METHOD

CROSS REFERENCE TO RELATED APPLICATIONS

This non-provisional patent application is a continuation of U.S. patent application Ser. No. 12/965,786 entitled "COMPOSITE MANUFACTURING PLY COMPENSATION SYSTEM AND METHOD" filed on Dec. 10, 2010 and which claims a priority benefit to U.S. Provisional Application No. 61,285,191 entitled "COMPOSITE MANUFACTURING PLY COMPENSATION SYSTEM AND METHOD" filed in the United States Patent and Trademark Office on Dec. 10, 2009, the entirety of each of which is incorporated by reference hereby.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyrights whatsoever.

DESCRIPTION OF RELATED TECHNOLOGY

The present invention relates to the fabrication and manufacture of composite parts, and more particularly to a system for measuring manufactured dimensions of a first as-built part and generating additional uniquely shaped plies for layup and re-curing so that the final part meets production requirements.

SUMMARY

A laser radar measuring system scans and captures the surface geometry of a first build of a composite part. The as-built measurement data is compared against production specifications. Additional plies of composite material are then designed for placement on the sub-standard part. The plies may be layered and tapered depending on the area to be built up. Once the plies are calculated, they are laid out in an optimum manner on a composite material sheet for markup and cutting. This nesting saves material costs by putting the plies together in a layout that creates the least amount of waste. The plies are then located onto the as-built part guided by lasers for precise location. The as-built part and additional plies are then cured together. Finally the revised part is re-measured to confirm that the newly as-built dimensions are within production tolerances.

The advantages and features discussed above and other advantages and features will become apparent from the detailed description of the best mode for carrying out the invention that follows.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6A shows a flowchart for the major processes of the invention;
FIG. 10 shows a composite airfoil being worked on.

DETAILED DESCRIPTION OF EMBODIMENTS

In an embodiment, the steps of the ply compensation system and method include:
 a) compare the "as-built" composite part data to the "as-designed" specification;
 b) determine and identify the zones not within engineering tolerances;
 c) calculate the shape and quantity of compensation plies required to build the part into engineering tolerances;
 d) automatically nest and cut the compensation plies;
 e) automatically generate the laser projection files to position compensation plies accurately;
 f) re-cure the composite part; and
 g) test the finished composite part for compliance with engineering tolerances Another embodiment comprises:
 a) compare "as built" composite part to "as designed;"
 b) determine zones out of engineering tolerances;
 c) calculate shape and quantity of compensation plies required to build part into engineering tolerance;
 d) automatically generate the nest and NC code to cut the compensation plies; and
 e) automatically generate the laser projection files to accurately position compensation plies.
 f) Automatically Generate Plots and Reports for Statistical Analysis, Cutting and Laser lay-up process.

Figure 1:
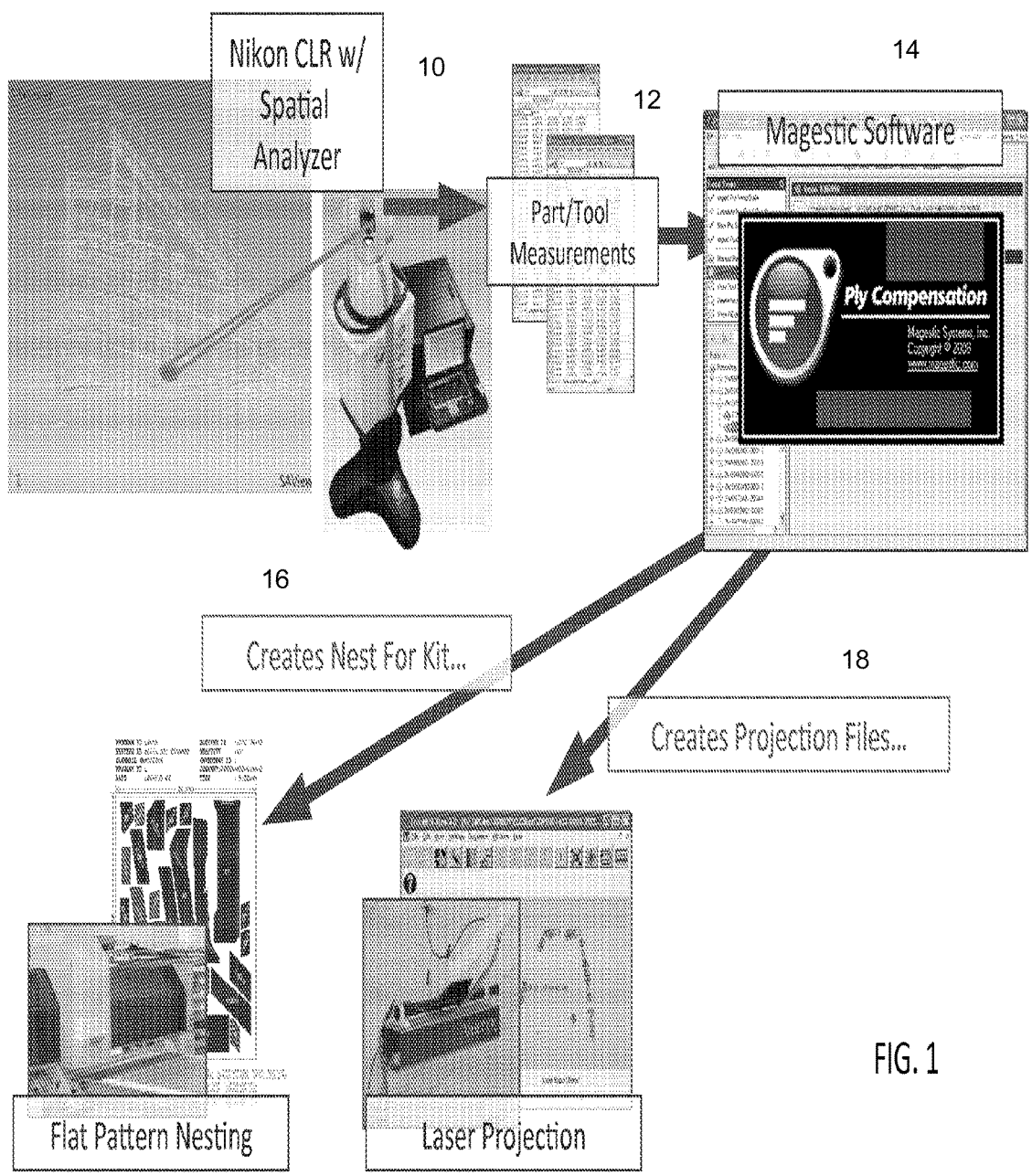
FIG. 1 is a block diagram of the invention.

Referring to FIG. 1, a block diagram illustrating a process overview is shown. First, at block 10, a laser radar scans the surface of an as-built part, and at block 12 creates a three-dimensional data set representing the surface of the as-built part. Data sets can be created using laser radar with a spatial analyzer. Laser radar works with the part compensation software by capturing the surface geometry of composite parts in a point cloud metrology system. Advantages include a fully automatic measurement without requiring SMR or other targets, and all required geometry information can be captured in one go.

Based on the data acquired the laser radar's scan of a composite part and creation of a point cloud of a tool's or part's surface, embodiments of the ply compensation system and method described herein manages the definition and creation of multi-layer compensation plies.

At block 14 the as-built surface is compared with and against a second data set that represents the as-designed surface. A third data is set is created representing the differential dimensions between the as-built surface and the as-designed surface. Any areas which are considered to be out of tolerance are then targeted for ply compensation. The software program using parameter inputs such as ply thickness, fiber orientation, stepping protocol, and other parameters for generating the appropriate number and thickness of plies, creates a series of patterns of plies which are to be cut out of a bolt of the ply cloth for layup on the substandard part.

A nesting module is configured to build nests of compensation plies and automatically cuts them out to be laid up. At block 16 the nesting software module takes the series of plies and assembles them into an optimum configuration which when laid out on the ply cloth will minimize material waste. The layout configuration may be printed on thin tracing paper for overlay on the ply cloth or alternatively the patterns may be projected onto the cloth for marking and subsequent cut out. For example, in an embodiment, a laser module kits the compensation plies while still on the cutting table and projects the exact location of where on the deficient part they need to be placed, and in keeping with all grain constraints.

At block 18,once the compensation plies have been cut out from the cloth, a laser projection program illuminates trace patterns on the substandard part to identify the location and orientation for placement of the compensation plies. The part is then cured a second time in an oven. After curing, the part is once again scanned with laser radar to create a new data set to be compared with the as designed data set.

Finally a quality reporting module compares the second as-built data set with the as-designed data set to generate a report showing the final as-built dimensions in compliance with the design specification. The finished composite part is then tested for tolerance.

Figure 2:
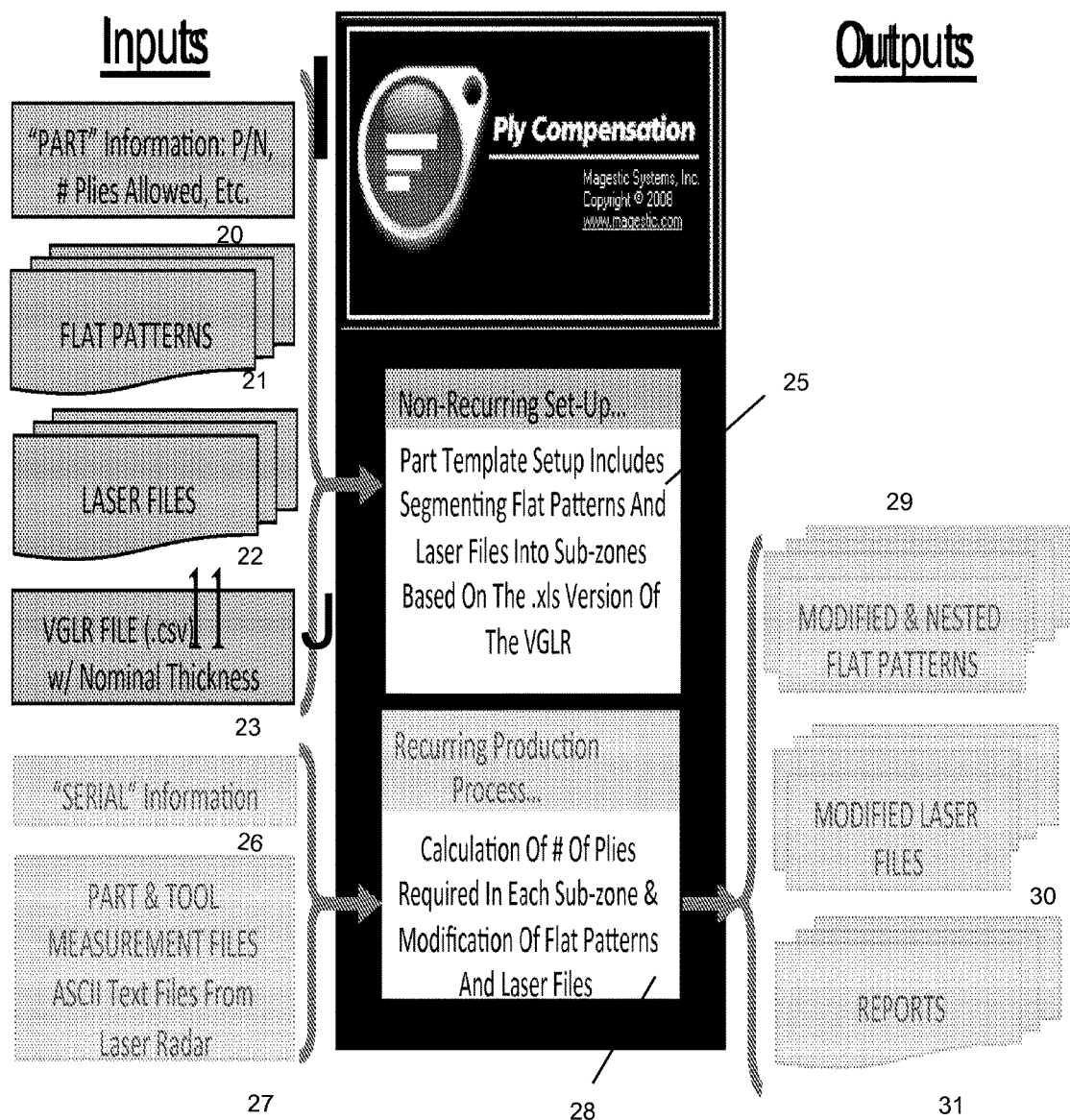
FIGS. 2A-2B are block diagrams of the ply compensation software architecture.
Figure 2B:
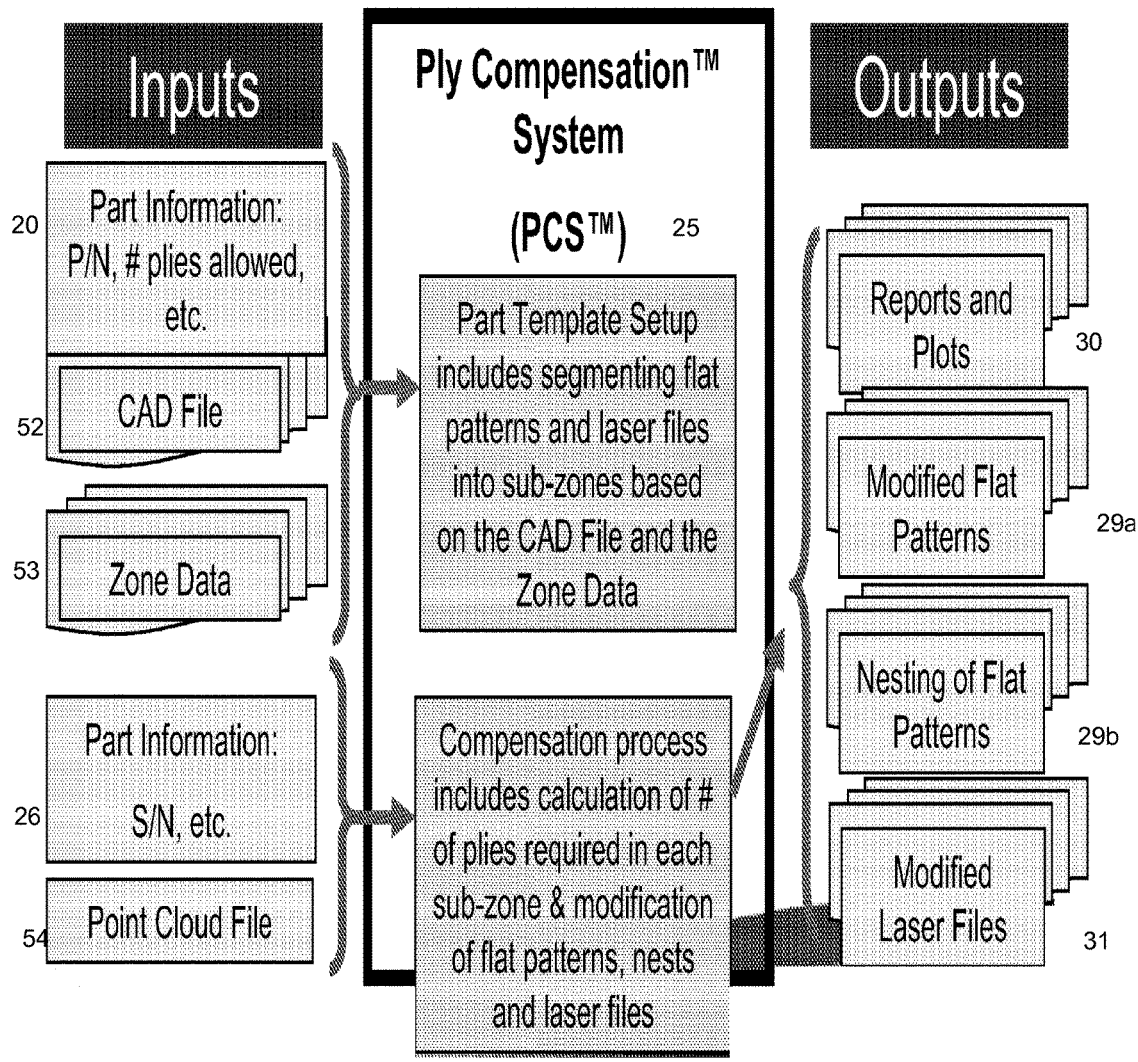

Now referring to FIGS. 2A-2B a block diagram of the ply compensation software data architecture is shown. The first set of inputs is the non-recurring data which is data particular to the design specifications of the part to be built. As shown in FIG. 2A, inputs for non-recurring set up include "Part" Information 20 (e.g.: part number P/N, number of plies allowed, etc.), Flat Patterns 21, Laser Files 22, and part analysis file such as a VGLR File 23 (.csv) with nominal thickness. In an embodiment as shown in FIG. 2B, the inputs for the non-recurring set-up can also include CAD files 52 and Zone Data 53 for the part 11. A Non-Recurring set-up module 25 includes a part template setup including segmenting flat patterns and laser files into sub-zones based on the part file, for example the VGLR file (shown as an .xls version of the VGLR) as shown in FIG. 2A or the CAD file and Zone Data as shown in FIG. 2B.

The second set of input data is the data collected by the laser radar representing the as-built dimensions and three-dimensional surface of the part being manufactured, such as Part Information (e.g serial no., etc.) 26 and part and tool measurement files (e.g. ASCII text files from laser radar 27 as shown in FIG. 2A or a Point Cloud File 54 as shown in FIG. 2B). These inputs are for a recurring production process module 28 configured to perform recurring production processes including calculation of number of plies required in each sub-zone and modification of flat patterns and laser files. The two data sets are compared to determine and locate surface areas that are not within desired tolerances. Those noncompliant areas are then targeted for build up with compensation plies. The compensation plies are shaped so as to match, fill and fit into the noncompliant areas of the composite part. Depending upon the depth and shape of the deficiency, one or more plies may be required in a stacking fashion to fill in that area which is non compliant. Further as plies are stacked, their perimeter dimension may be incrementally reduced or increased as to create the appropriate three-dimensional shape as required by the design specification. Such stacked shaped may be thought of as pyramidal, and depending upon the deficient area, may be right side up or inverted.

The ply compensation software outputs modified flat patterns 29a and nested flat patterns 29b, modified laser files 31, and reports 30. The laser files are modified so as to project the areas where the compensation plies will be applied. A multitude of reports 30 are generated to document the manufacturing, surveying, compensation, re-scanning, and final as-built dimensions.

Figure 3:
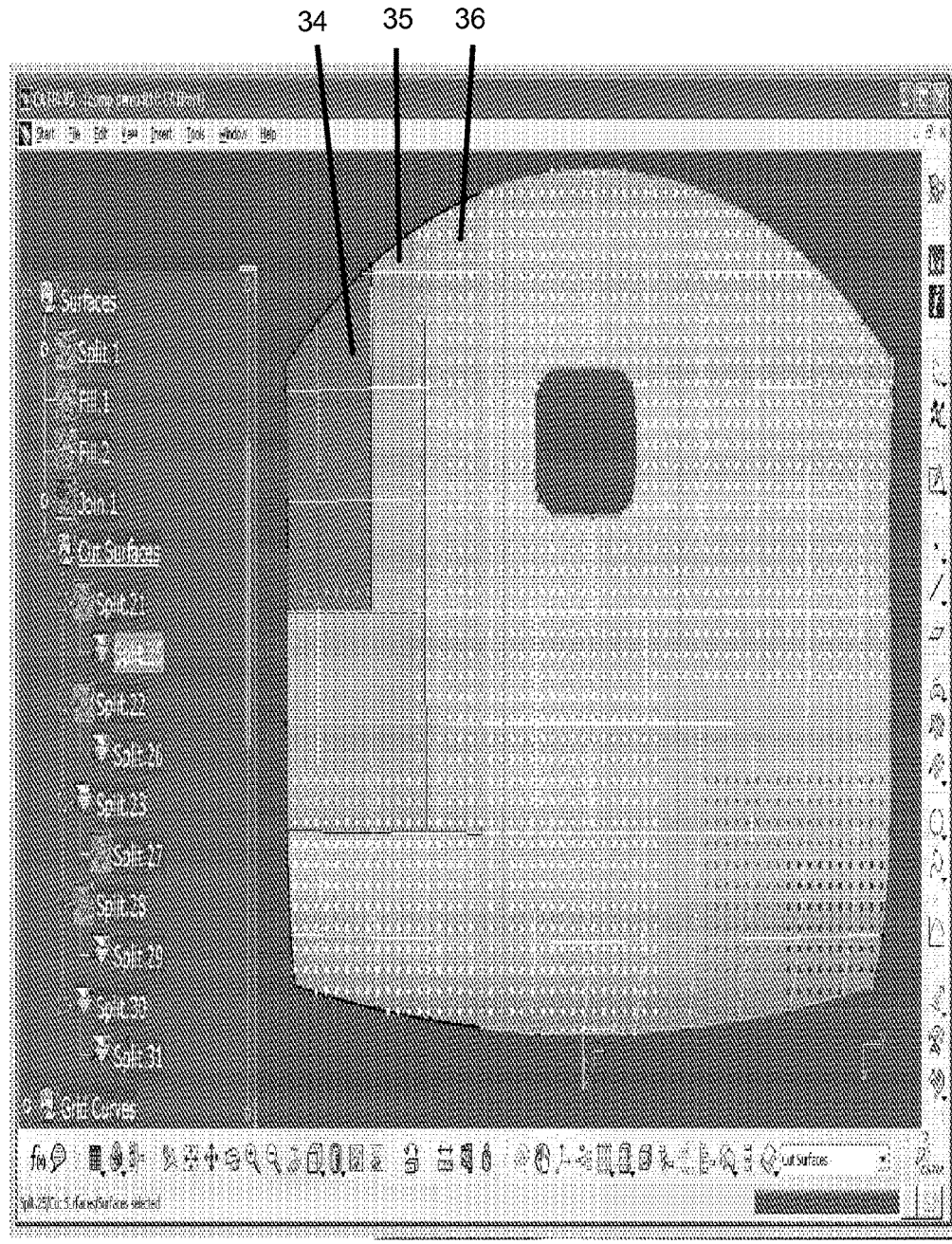
FIG. 3 shows a particular arrangement of the compensation plies being applied to a deficient part.
Figure 10:
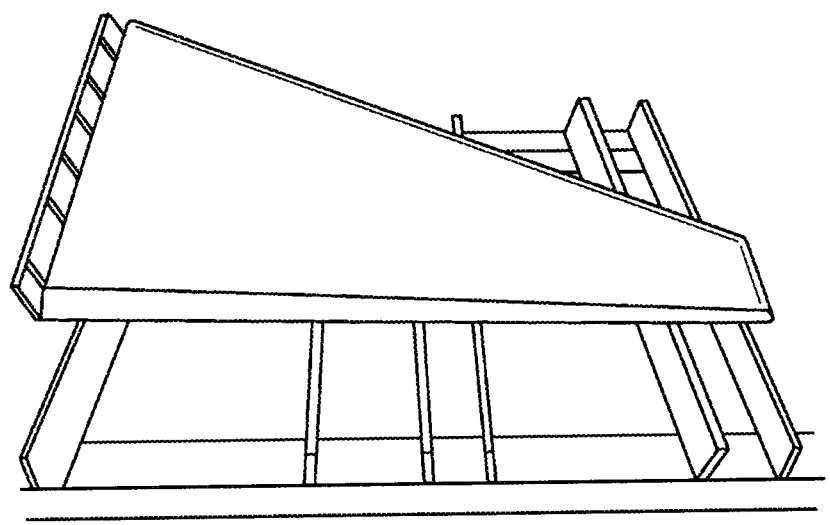

FIG. 3 shows a particular arrangement of the compensation plies being applied to a deficient part. The embodiments are described employing the example of manufacturing a car hood, however embodiments can be used for any composite part manufacture. Composite materials are widely used in manufacture, for example in aviation components (tails, wings, fuselages, propellers), space vehicles, boat hulls, racecar bodies, storage tanks, turbine blades and even baseball bats. For example FIG. 10 shows a composite airfoil 71 being worked on. This horizontal stabilizer is a typical airframe part to which the process may be applied. As shown in FIG. 3, a deficient area 33 is being built up on the left-hand side of the part. Several layers of compensation plies are being stacked to bring the composite part within design tolerances. A smaller ply indicated by the dark area 34 is stacked upon a larger ply area 35, which is further stacked upon and even larger ply area 36. This pyramidal stacking brings the substandard part into compliance with the design specification.

Figure 4:
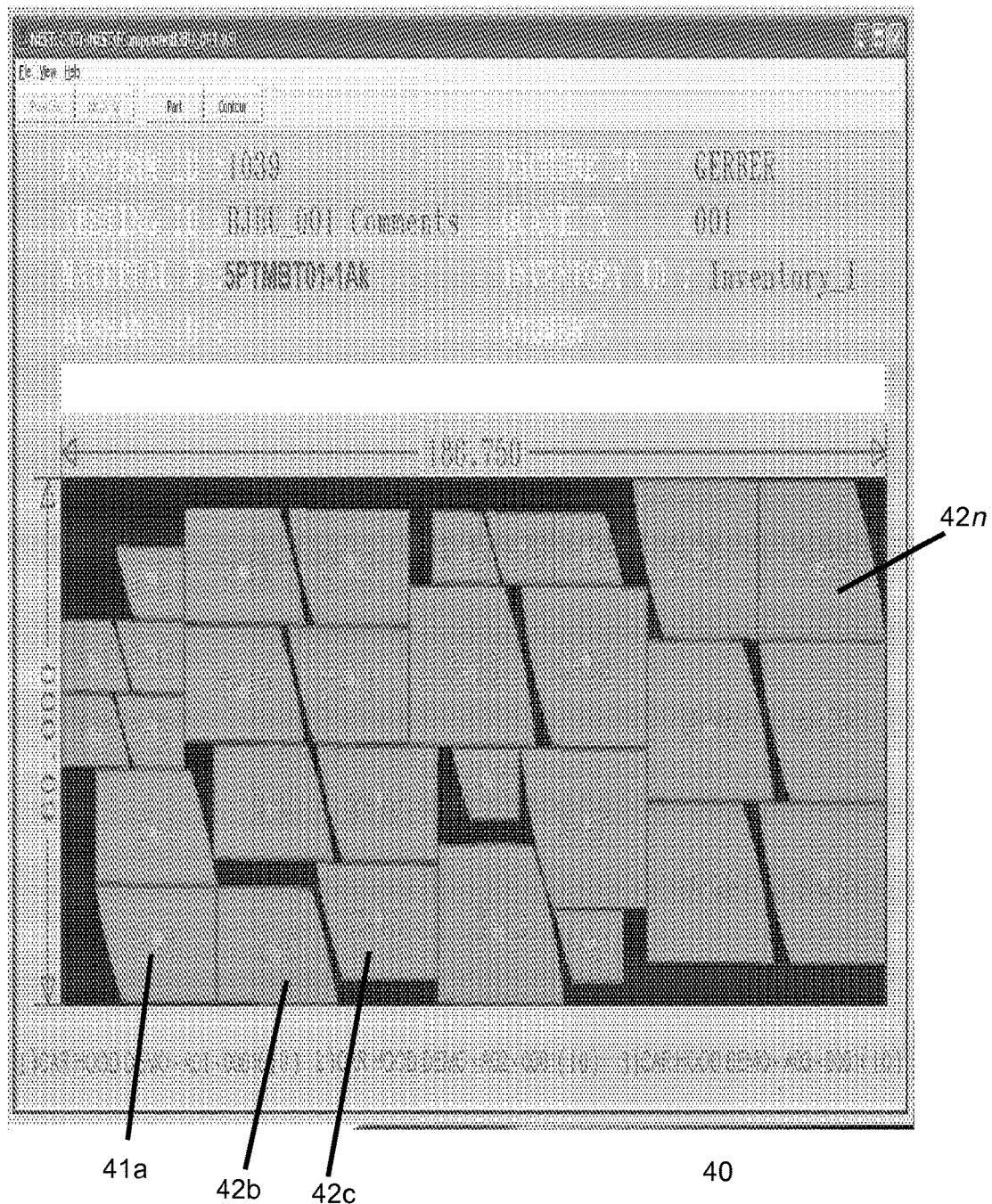
FIG. 4 is a computer screen shot showing how the compensation plies are nested to minimize waste.

FIG. 4 is a computer screen shots 40 showing how the compensation plies 41a, 41b, 41c . . . 41n are nested to minimize waste. Note that each ply 41a, 41b, 41c . . . 41n is labeled with a unique number which will be used to identify its location during placement on to the sub-standard part. Also note how the plies 41a, 41b, 41c . . . 41n have been arranged so as to minimize wasted material after they have been cut from the cloth. The nesting program generates the machine code instructions for the CNC machine to perform the cutting operation. FIG. 7C is a screenshot of the invention performing a calculation to determine the size and location of compensation plies. In the lower right-hand corner a series of very thin plies are required to compensate. In embodiments, different colors are used by the computer program to indicate the thickness required for compensation. The color scheme may be selected and or assigned by the operator.

Figure 5A:
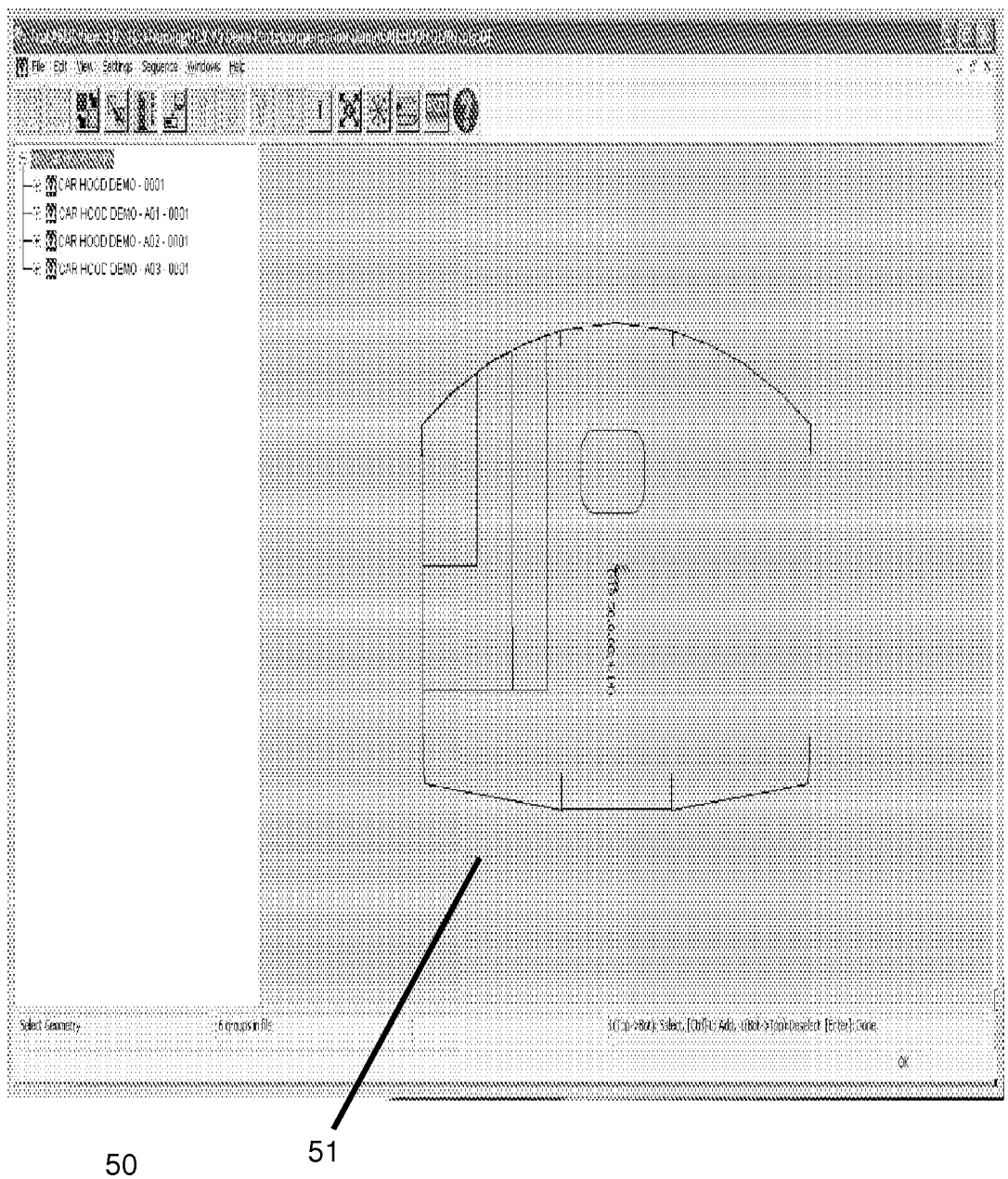
FIGS. 5A-5B are computer screen shots showing the trace paths that the laser projection system will draw on the deficient part to assist in the ply layout.
Figure 5B:
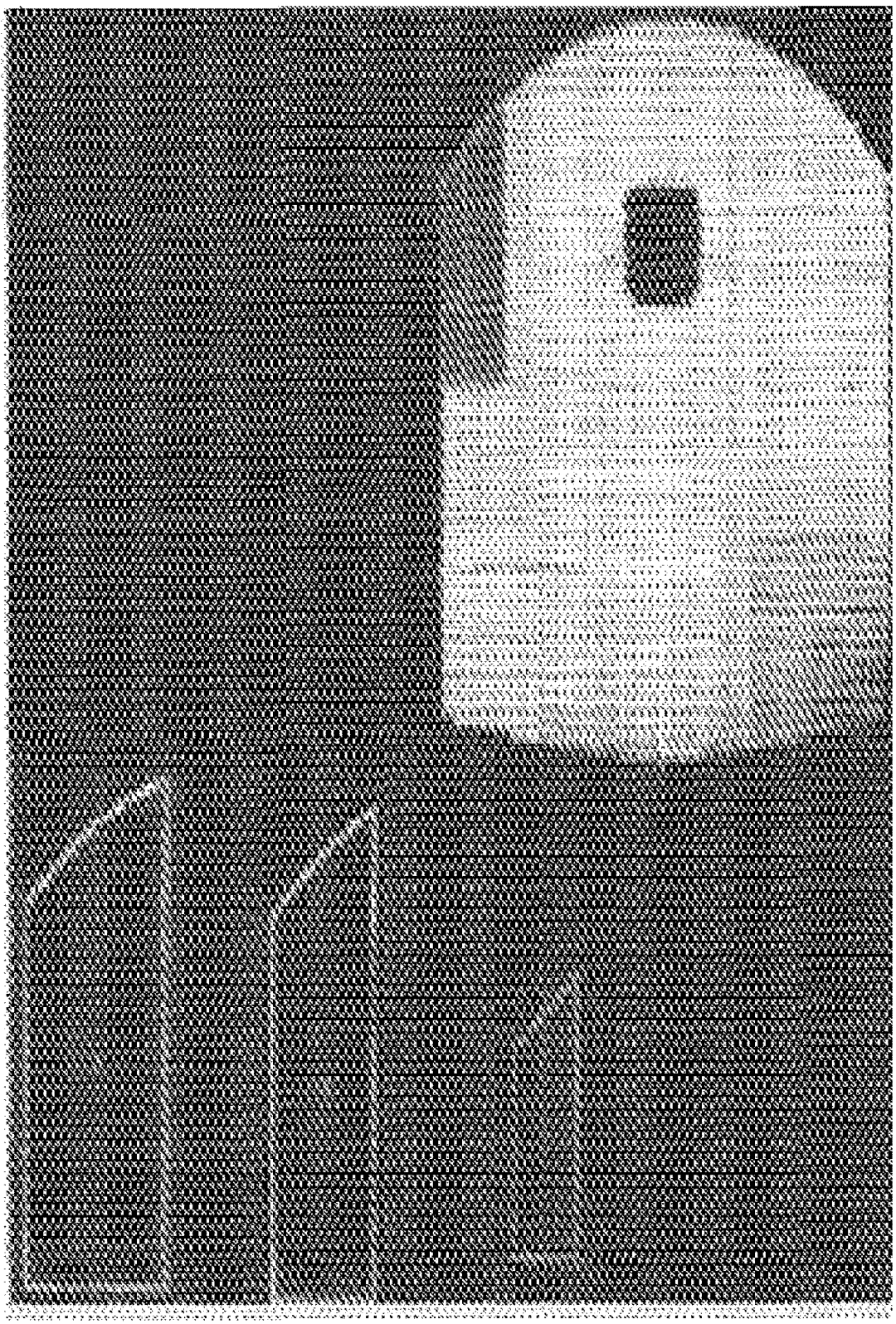

FIGS. 5A-5B are computer screen shots showing the laser projection technology which draws illuminated shapes to assist in the placing and location of the compensation plies. The computer screen shots 50 show i the trace paths 51 that the laser projection system will draw on the deficient part to assist in the ply layout. These are the locations where the plies will be laid on to the substandard part. As shown in FIG. 5B the individual plies may be viewed separately or in a stacked manner.

FIG. 6A shows a block diagram flowchart for the major processes of the invention. The software program collects the standard part data and the substandard part data, compares the two data sets to find deficiencies, determines the size and location for compensation plies, automatically nests the plies to minimize waste of material, generates instructions to cut the plies, generates new laser files to project outlines for placing the plies onto the substandard part, and processes the rescan data after the part has been cured to verify final part compliance. As shown in FIG. 6A, at block 60 the software is configured to compare the "as-built" composite part data to the "as-designed" specification and determine where the as built composite parts deviate from as-designed plans. At block 61 the software is configured to measure nominal part deviation. At block 62, the software is configured to determine the size and location for compensation plies, for example as shown in the screen shot 40 of FIG. 3. Thus the software is configured to calculate the shape and quantity of compensation plies required to build the part into engineering tolerances as described above with respect to FIG. 3. At block 63 the software is configured to generate instructions to automatically nest and cut the compensation plies to bring the substandard part into compliance, as shown and described with respect to the screen shot of FIG. 4. At block 64 the software is configured to automatically generate the laser projection files to position compensation plies accurately as shown in the example of FIG. 5, and once the plies are positioned, re-cure the composite part. At block 65 the software is configured to test the finished composite part for compliance with engineering tolerances. In an embodiment, as shown in FIG. 6A, if the re-cured composite part is not in compliance, the software can be configured to reiterate the process starting again at block 61 and repeats the process until compliance is verified as shown at block 65. FIG. 7 shows a large industrial kiln 70 for curing composite parts. An end cover swings away to open the end of the tubular chamber. Parts to be cured are slid into the oven for a predetermined number of heating cycles.

Figure 6B:
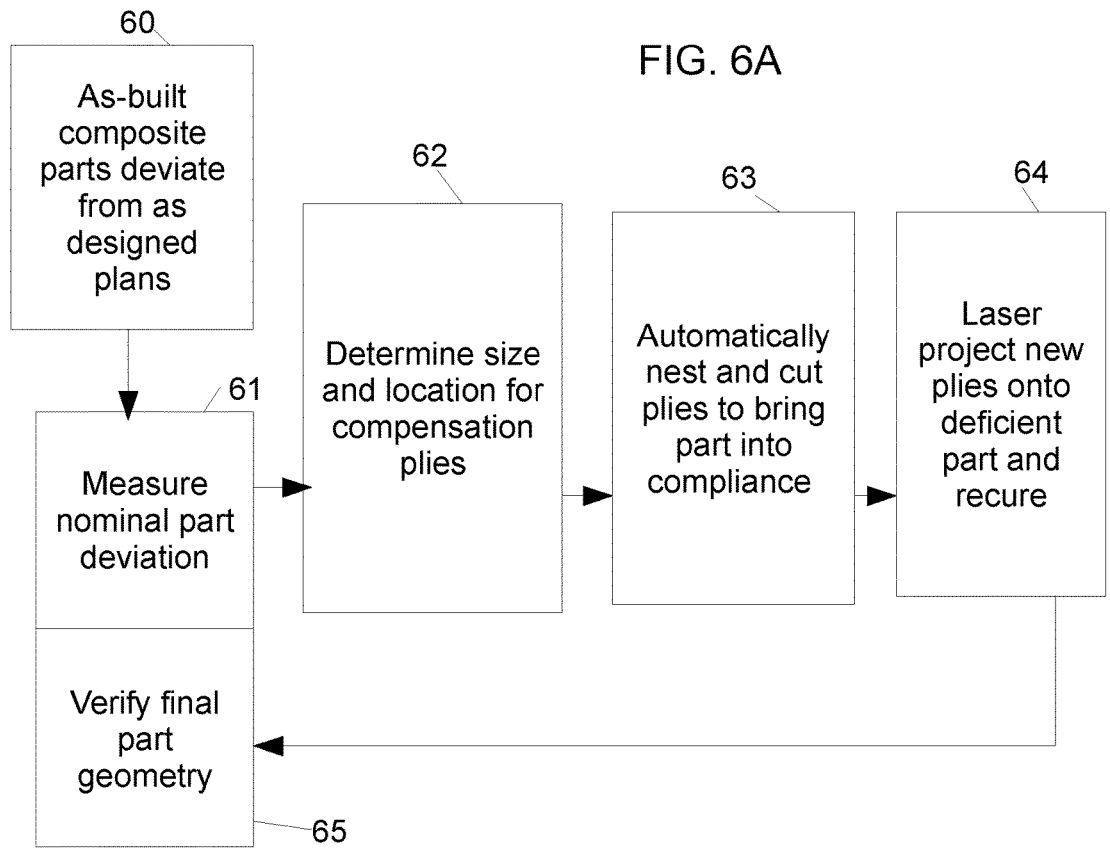
FIG. 6B is a side elevation view of a composite part showing the application of compensation plies to achieve a nominal surface.
Figure 6B:
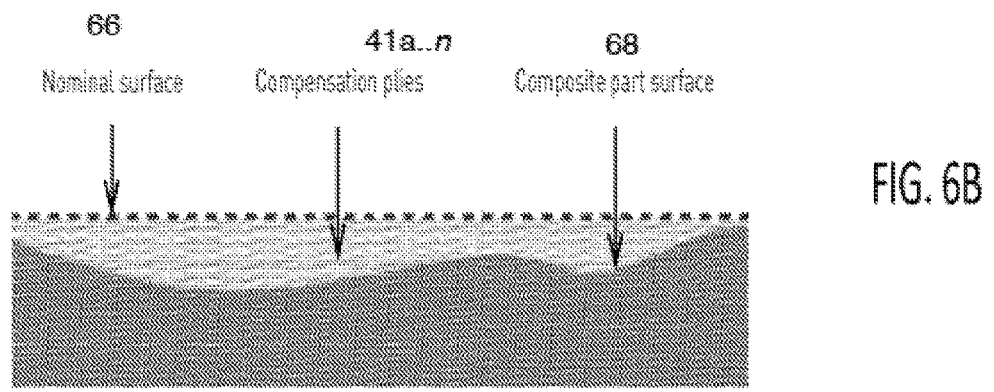
Figure 7:
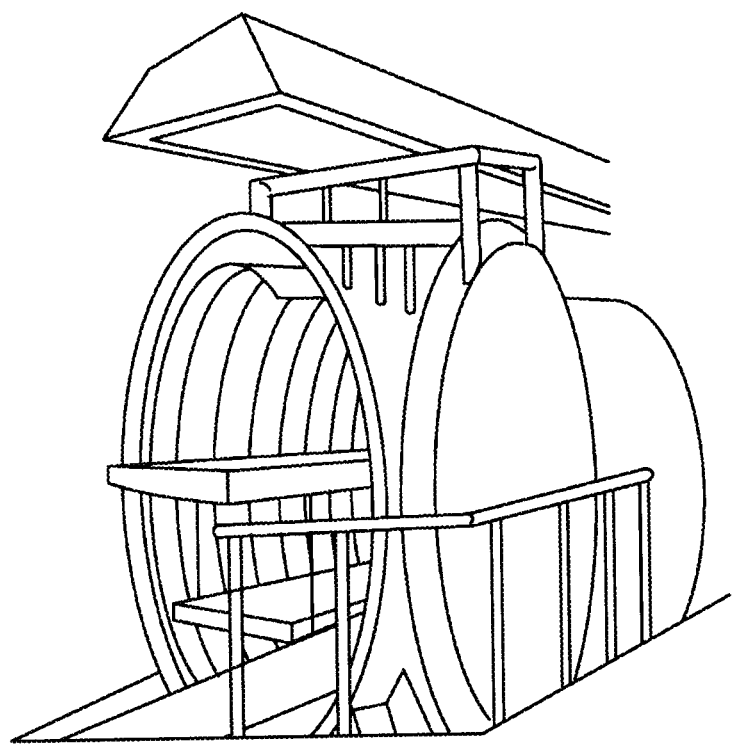
FIG. 7 shows a large industrial kiln for curing composite parts.

FIG. 6B is a side elevation view of a composite part 11 showing the application of compensation plies 41a . . . n to achieve a nominal surface 66. Note the composite part's surface is significantly below the nominal surface 66 which creates the substandard part. The dimensional difference between the nominal surface 66 and the composite part surface 68 exceeds the specified tolerance for the final part 11. Therefore, in those areas where the as-built part is noncompliant, compensation plies 41a . . . . n will be shaped and designed to fill in these deficient areas. The addition of the compensation plies 41a . . . n will raise the finished surface up to the desired nominal surface 66, and thus the finished part will be within design tolerances.

Figure 8:
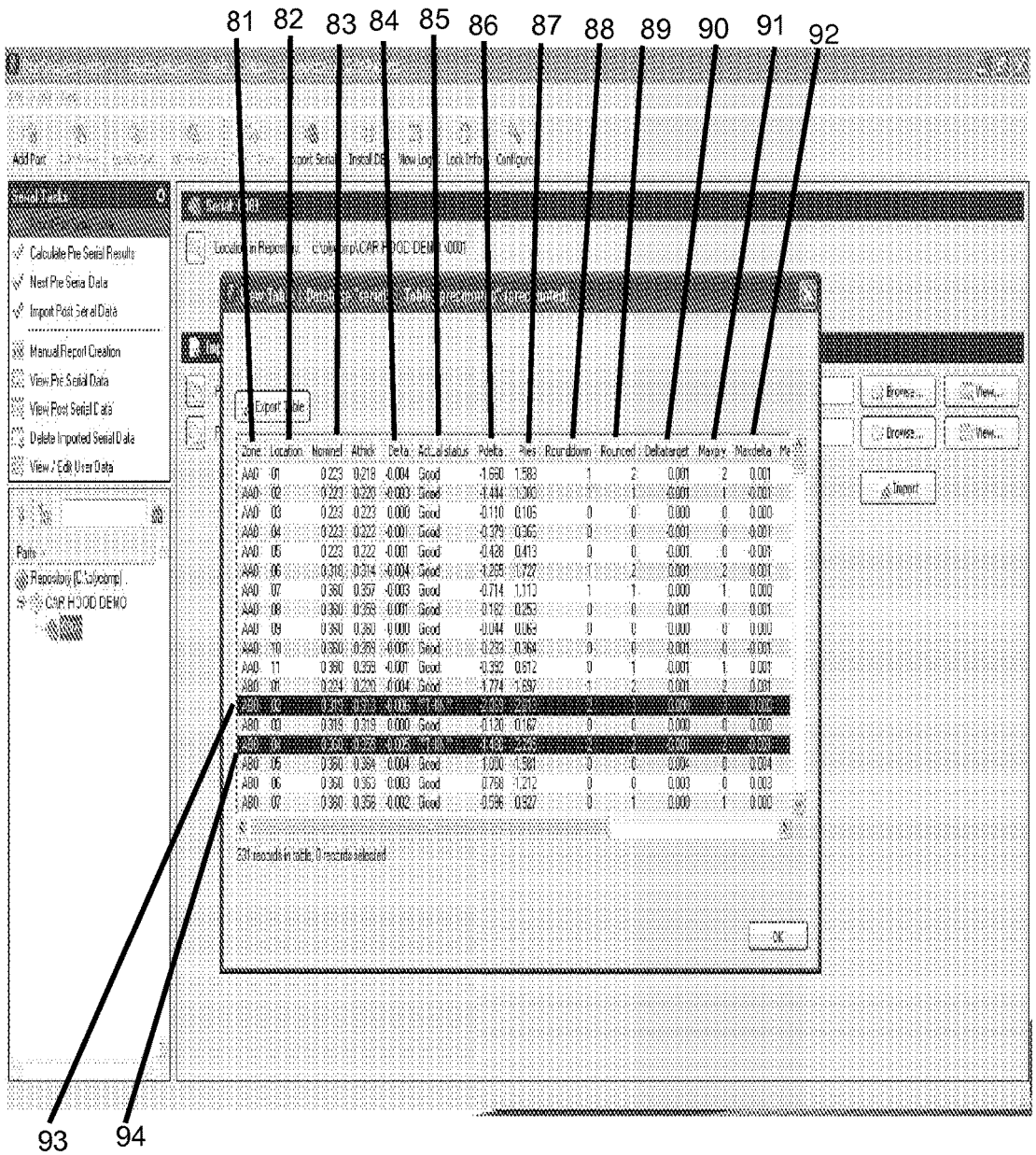
FIG. 8 is a computer screen shot illustrating the reporting feature of the invention.

FIG. 8 is a computer screen shot 80 illustrating the reporting feature of the invention indicating those areas that required ply compensation. Various parameters are recorded and reported such as dimensional data, ply count, discrepancy amount, thickness, location, and orientation (alignment of fibers and/or fabric grain if required). As shown in FIG. 8, the report includes, for each location of the composite part 11, inter alia, Zone 81, Location 82, Nominal 83, Actual Delta 84, Actual status 85, Pdelta 86, Plies 87, Rounddown 88, Rounded 89, Deltatarget 90, Maxply 91, Maxdelta 92, and so on. As shown in FIG. 8, a discrepancy Delta is shown for each zone location, and a status for the composite at that location indicating whether the composite is within tolerance (Good) or out of tolerance (e.g, "Thin" or "Thick"). For example, the report shows that row 93 for Zone AB0 Location 02 and the row 94 for Zone AB0 Location 04 of the composite part 11 are "Thin" and thus may require additional ply build up to meet tolerance, and also gives information how far out of tolerance the part is using report data categories above.

Figure 9:
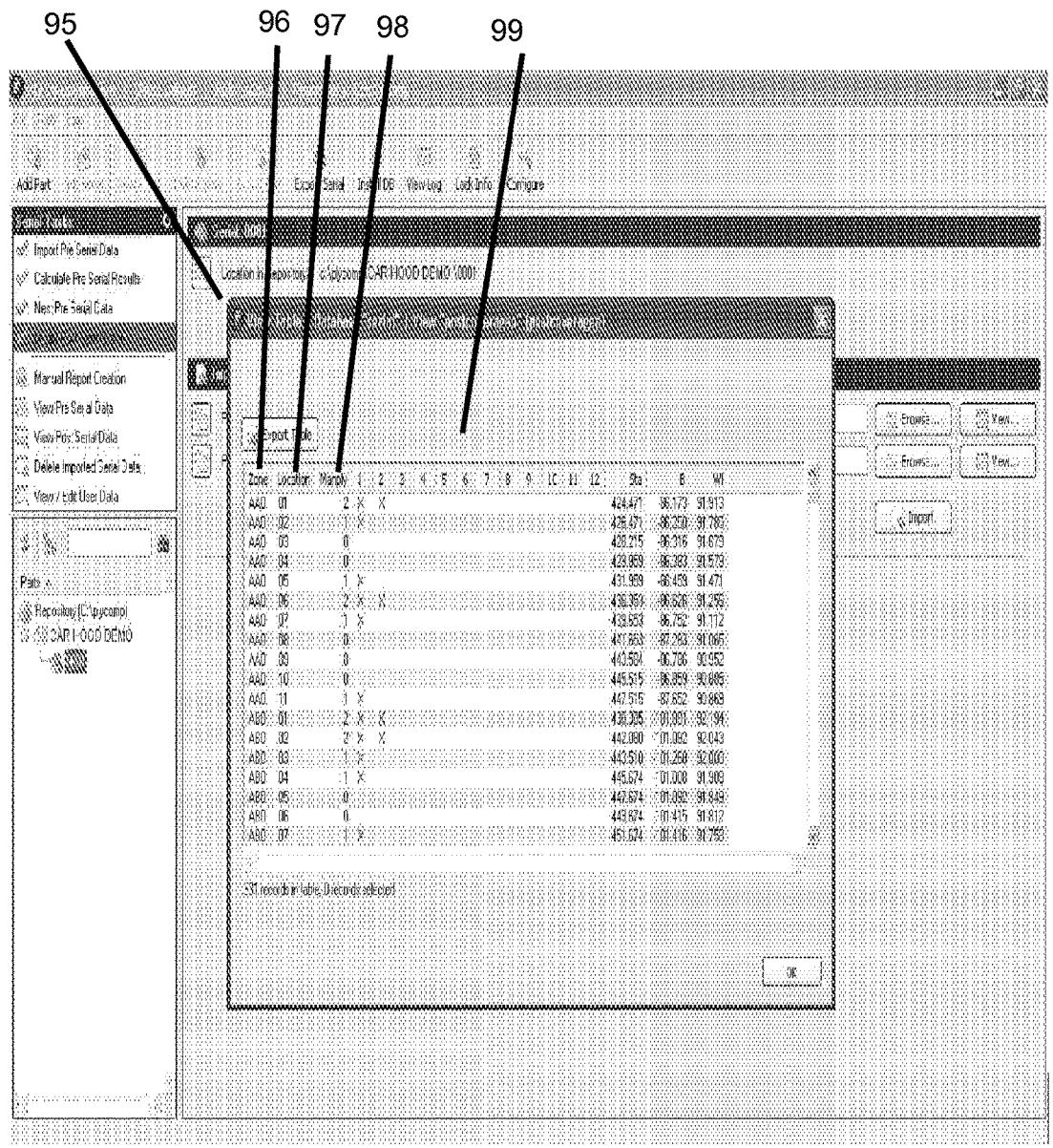
FIG. 9 is a computer screen shot illustrating a coverage map generated by the invention

FIG. 9 is a computer screen shot 100 illustrating a coverage map 95 generated by the invention. The coverage map 95 may be used to generate and or modify laser files to project location information onto the substandard part for the application of compensation plies. Information can include Zone 96, Location 97, Number of Plies 98, nesting or layering of plies (1-12) 99, The coverage map 95 may also be used to generate graphical information for the operator and or to support the reporting functions of the invention.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore we claim:

1. A system for assisting in the manufacture of a composite part comprising:
   an input configured to receive three-dimensional surface geometry data set of an as-built composite part;
   a computer module configured to
      compare the surface geometry data set to a data set for design specifications for the composite part, wherein the data set for the design specifications include part information including a number of plies allowed;
      generate a ply shape and dimension differential data set representing the differential dimensions between the as-built surface and the as-designed surface;
   identify at least one area of the as-built composite part that is out of tolerance with the design specifications for the composite part based on the differential data set;
      generate a compensation data set for one or more compensation plies to be cut from a ply sheet; and
      identify the placement location of each of the one or more compensation plies with respect to the as-built composite part.

2. The system of claim 1, further comprising:
   an input configured to receive and store a three-dimensional surface geometry data set of the composite part including the compensation plies after the compensation plies have been placed and the composite part recured;
   the computer module configured to compare the surface geometry data set of the composite part including the compensation plies to the data set for the design specifications for the composite part.

3. The system of claim 2, further comprising:
   a quality reporting module configured to generate a compliance report based on the comparison of the surface geometry data set of the composite part including the compensation plies to the data set for the design specifications for the composite part.

4. The system of claim 2 further wherein the computer module is further configured to:
   generate a ply shape and dimension differential data set representing the differential dimensions between the surface of the composite part including the compensation plies and the as-designed surface;
   identify at least one area of the composite part including the compensation plies that is out of tolerance with the design specifications for the composite part based on the differential data set;
      generate a compensation data set for one or more additional compensation plies to be cut from a ply sheet; and identify the placement location of each of the one or more additional compensation plies with respect to the as-built composite part.

5. The system of claim 1, wherein the three-dimensional surface geometry data set of the first as-built composite part is derived from a laser scan of the as-built composite part.

6. The system of claim 1, wherein said computer module is configured to generate the compensation data set using parameter inputs comprising parameters including at least one of ply thickness, fiber orientation, and stepping protocol.

7. The system of claim 1, wherein said computer module is configured to generate the compensation data set including a number, thickness, and pattern for the one or more compensation plies.

8. The system of claim 1, wherein said computer module is configured to generate the compensation data set by at least:
determining and locating one or more surface areas that are noncompliant with the design specification; and
generating a data set comprising instructions to shape and place one or more compensation plies to fill the noncompliant surface areas.

9. The system of claim 8 wherein generating the data set further comprises generating instructions to stack a plurality of plies to fill the one or more noncompliant areas.

10. The system of claim 9 wherein the generating the data set further comprises generating instructions to incrementally change one or more perimeter dimensions of one or more of the plurality of plies to create a three-dimensional shape that fills the one or more noncompliant areas.

11. The system of claim 1, wherein the computer module is configured to
generate instructions for cutting said compensation plies out of said a sheet.

12. The system of claim 11, wherein the computer module is configured to output instructions to a laser projection module to configure a laser to illuminate locations on the ply sheet.

13. The system of claim 1, wherein the computer module is configured to generate laser files to project outlines for placing the compensation plies on the as-built part and output the laser files to a laser projection module to configure the laser to illuminate locations on the as-built composite part for applying the compensation plies.

14. A method for manufacturing a composite part with a ply compensation system comprising:
receiving and storing a three-dimensional surface geometry data set for an as-built composite part into the ply compensation system;
comparing the surface geometry data set to a data set for the design specifications for the composite part, wherein the data set for the design specifications include part information including a number of plies allowed;
generating a ply shape and dimension differential data set representing the differential dimensions between the as-built surface and the as-designed surface;
identifying at least one area of the as-built composite part that is out-of-tolerance with the design specification for the composite part based on the differential data set and
generating a compensation data set for one or more compensation plies to be cut from a ply sheet; and
generating a data set comprising instructions to shape and place one or more compensation plies to fill the at least one out-of-tolerance area.

15. The method of claim 14, further comprising:
receiving and storing a three-dimensional surface geometry data set of the composite part including the compensation plies after the compensation plies have been placed and the composite part recured;
comparing the surface geometry data set of the composite part including the compensation plies to the data set for the design specifications for the composite part; and
generating a compliance report based on the comparison of the surface geometry data set of the composite part including the compensation plies to the data set for the design specifications for the composite part.

16. The method of claim 15, further comprising generating the compensation data set using parameter inputs comprising parameters including at least one of ply thickness, fiber orientation, and stepping protocol.

17. The method of claim 14 further comprising generating the compensation data set including a number, thickness, and pattern for the one or more compensation plies.

18. The method of claim 17 wherein generating the data set further comprises generating instructions to stack a plurality of plies to fill the one or more out-of-tolerance areas.

19. The method of claim 18 wherein the generating the data set further comprises generating instructions to incrementally change one or more perimeter dimensions of one or more of the plurality of plies to create a three-dimensional shape that fills the one or more noncompliant areas.

20. The method of claim 14, wherein the method comprises:
generating laser files to project outlines for placing the compensation plies on the as-built part and outputting the laser files to a laser projection module to configure the laser to illuminate locations on the as-built composite part for applying the compensation plies.

21. The method of claim 14, wherein the method comprises outputting the instructions to a laser projection module to configure the laser to illuminate cutting locations on a ply sheet.

22. The method of claim 15 further wherein the method further comprises:
generating a ply shape and dimension differential data set representing the differential dimensions between the surface of the composite part including the compensation plies and the as-designed surface;
identifying at least one area of the composite part including the compensation plies that is out of tolerance with the design specifications for the composite part based on the differential data set;
generating a compensation data set for one or more additional compensation plies to be cut from a ply sheet; and
identifying the placement location of each of the one or more additional compensation plies with respect to the as-built composite part.

* * * * *